United States Patent
Mohan et al.

(10) Patent No.: US 10,552,495 B2
(45) Date of Patent: *Feb. 4, 2020

(54) LINKED NETWORK PRESENCE DOCUMENTS ASSOCIATED WITH A UNIQUE MEMBER OF A MEMBERSHIP-BASED ORGANIZATION

(71) Applicant: AFILIAS LIMITED, Dublin (IE)

(72) Inventors: Cedarampattu Mohan, Horsham, PA (US); James Galvin, Horsham, PA (US)

(73) Assignee: AFILIAS LIMITED, Dublin (IE)

( * ) Notice: Subject to any disclaimer, the term of this patent is extended or adjusted under 35 U.S.C. 154(b) by 517 days.

This patent is subject to a terminal disclaimer.

(21) Appl. No.: 15/232,486

(22) Filed: Aug. 9, 2016

(65) Prior Publication Data
US 2018/0046711 A1    Feb. 15, 2018

(51) Int. Cl.
| | |
|---|---|
| G06F 17/30 | (2006.01) |
| G06F 16/951 | (2019.01) |
| G06F 16/93 | (2019.01) |
| G06F 16/335 | (2019.01) |
| G06Q 10/10 | (2012.01) |
| G06Q 50/00 | (2012.01) |

(Continued)

(52) U.S. Cl.
CPC .......... *G06F 16/951* (2019.01); *G06F 16/337* (2019.01); *G06F 16/93* (2019.01); *G06Q 10/10* (2013.01); *G06Q 50/01* (2013.01); *H04L 61/3015* (2013.01); *H04L 67/306* (2013.01)

(58) Field of Classification Search
CPC ...... G06F 16/951; G06F 16/337; G06F 16/93; G06Q 10/10; G06Q 50/01; H04L 61/3015; H04L 67/306; H04L 61/1511
See application file for complete search history.

(56) References Cited

U.S. PATENT DOCUMENTS 9,438,619 B1 * 9/2016 Chan ................. G06F 16/24578
9,721,296 B1 * 8/2017 Chrapko ............ G06Q 10/0635
(Continued)

OTHER PUBLICATIONS

WIPO, International Search Report and Written Opinion for International Application No. PCT/US2017/046037, dated Dec. 26, 2017.
(Continued)

*Primary Examiner* — Jared M Bibbee
(74) *Attorney, Agent, or Firm* — Haynes and Boone, LLP

(57) ABSTRACT

A system for providing a directory service for generating network presence documents may include a computer processor and memory having instructions stored thereon. These may instruct the processor to parse registration information of a member to obtain a set of keywords. Using the set of keywords, the network maybe searched for information about the member, and registration information may be created based on the information. A trusted network presence document may be generated to include at least a first portion of the registration information as read only content. A link may be created between a profile document and the trusted network presence document. The profile document may include at least a second portion of the registration information as customizable content customizable by the member. The document may then be published on the network.

25 Claims, 3 Drawing Sheets

(51) Int. Cl.
*H04L 29/12* (2006.01)
*H04L 29/08* (2006.01)

(56) References Cited

U.S. PATENT DOCUMENTS

| | | | | |
|---|---|---|---|---|
| 2006/0021018 A1* | 1/2006 | Hinton | ............ | H04L 63/06 726/10 |
| 2008/0077517 A1* | 3/2008 | Sappington | ............ | G06Q 10/04 705/35 |
| 2009/0172783 A1* | 7/2009 | Eberstadt | ............ | G06Q 10/107 726/4 |
| 2011/0167036 A1* | 7/2011 | Liebman | ............ | G11B 27/034 707/608 |
| 2013/0086081 A1* | 4/2013 | Schonfeld | ............ | G06F 16/958 707/748 |
| 2014/0123253 A1* | 5/2014 | Davis | ............ | G06F 21/316 726/6 |
| 2014/0214895 A1* | 7/2014 | Higgins | ............ | G06F 16/3325 707/770 |
| 2015/0013000 A1* | 1/2015 | Linnakangas | ............ | H04L 63/08 726/14 |
| 2015/0304408 A1* | 10/2015 | Carroll | ............ | G06F 16/00 709/219 |
| 2016/0277424 A1* | 9/2016 | Mawji | ............ | H04L 63/1408 |
| 2017/0155659 A1* | 6/2017 | Baltar | ............ | H04L 63/102 |
| 2017/0235766 A1* | 8/2017 | Mawji | ............ | H04W 4/02 707/722 |

OTHER PUBLICATIONS

WIPO, International Search Report and Written Opinion for International Application No. PCT/US2017/046031, dated Sep. 1, 2017.

\* cited by examiner

LINKED NETWORK PRESENCE DOCUMENTS ASSOCIATED WITH A UNIQUE MEMBER OF A MEMBERSHIP-BASED ORGANIZATION

FIELD

The present invention is related to generation and customization of linked documents available over a network.

BACKGROUND

In the current realm of digital communication, users share information they consider important over networks such as the Internet, using published content such as wikis, blogs, social networking and other network site content publication forums. Unfortunately, digital content can include valuable as well as biased, false and demagogic information.

As such, computer networks have become a familiar way of acquiring and sharing information that also allows content owners and network users to contribute and express themselves. Thus, information providers (e.g. Web site owners) and information seekers (e.g. Web site users) will rely more and more on content available over networks, and therefore the ability to provide as well as to access trusted network content will become even more essential.

Trustworthiness of network content, as well as access to content via network navigation tools, e.g. Web browsers in the case of the Internet, refers to the believability and trustworthiness of a content/navigation tool source. In the case of network trustworthiness, it refers to the trustworthiness of the content available on the network. Network content and network document (e.g. page) navigation tools can take many forms including text, sounds, videos, and images as well as hyperlinks, drop down menus, etc.

It is a disadvantage with the current structure of network documents that multimedia and/or navigational tools encountered by the network user can unknowingly include false or otherwise malicious content. While it is true that network users and content providers alike enjoy the lower cost and increased access to information provided by the current world of interconnected network documents, i.e. enabled users to access content from a number of deemed appropriate sources including Websites, blogs, e-news, wikis, e-books, e-libraries and e-journals, what bears important consideration is whether the vast amount of network information provided and accessed can be relied upon to be trustworthy. As such, it can be very difficult for a typical network user to adequately verify given information without any prior knowledge, and the same is true for content providers in being able to prove to the network users that the information published is accurate and deemed as trustworthy.

BRIEF DESCRIPTION OF THE DRAWINGS

Exemplary embodiments of the invention will now be described in conjunction with the following drawings, by way of example only, in which.

SUMMARY

Figure 1:
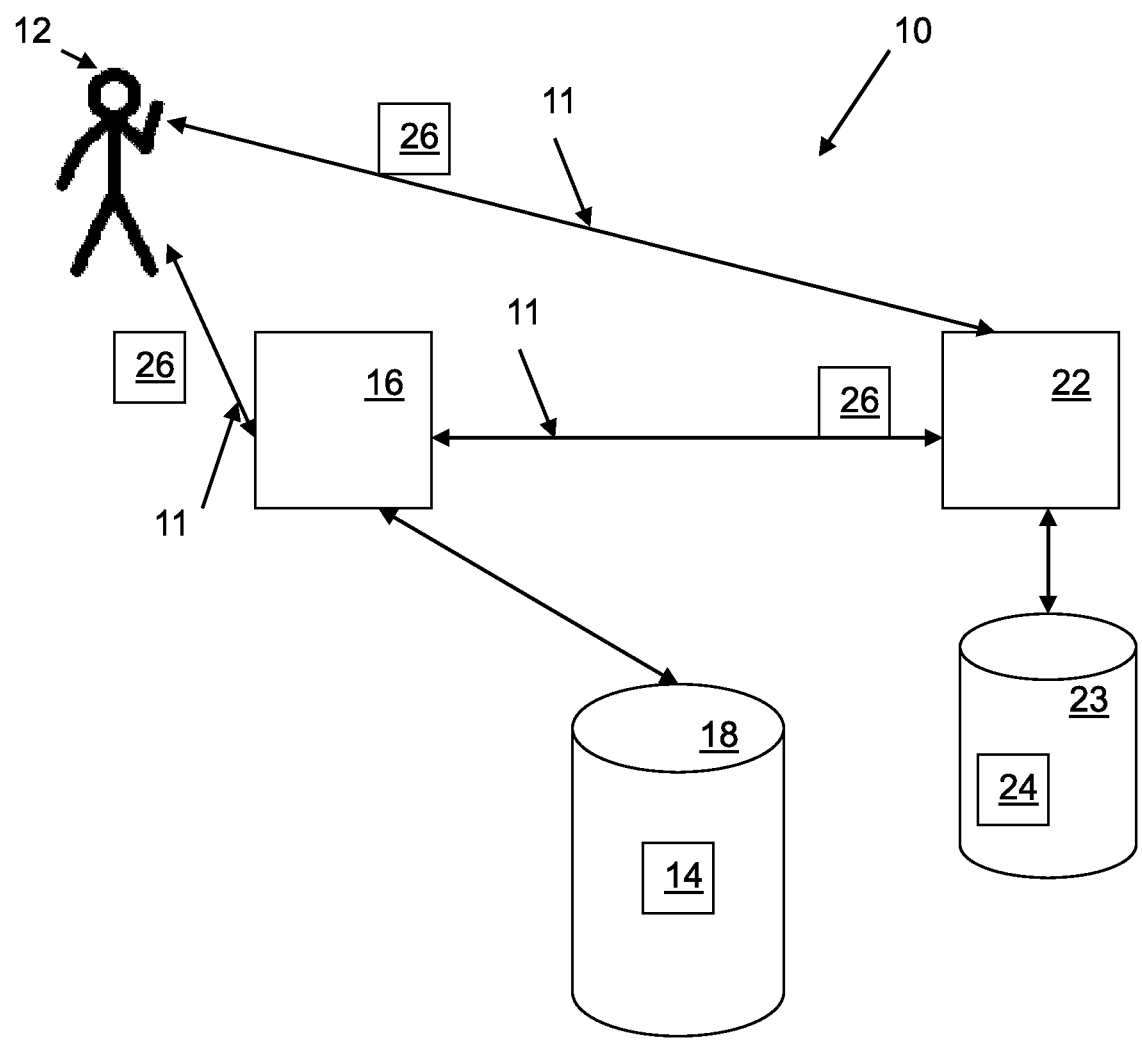
FIG. 1 is a block diagram of components of a membership name registration system.

It is an object of the present invention to provide a system to obviate or mitigate at least some of the above presented disadvantages.

A first aspect provided is a system for providing a directory service for generating network presence documents made available on a network, the system comprising: a computer processor and memory having instructions stored thereon for implementation by the computer processor to: receive registration information of a membership name by a member of a membership based organization; parse the registration information to obtain a set of keywords; search the network using the set of keywords for publically available information about the member; create member information based on information obtained from the search using the set of keywords; generate a trusted network presence document of the network presence documents to include at least a first portion of the registration information as read only content with respect to the member, such that the member is restricted from customizing the read only content; create a link between a profile document and the trusted network presence document of the network presence documents, the link configured for placement on at least one of the network presence documents such that the profile document and the trusted network presence document would be linked to one another, the profile document including customizable content with respect to the member such that the member is allowed to customize the customizable content; and publish the trusted network presence document on the network.

A second aspect provided is a system for providing a directory service for generating network presence documents made available on a network, the system comprising: a computer processor and memory having instructions stored thereon for implementation by the computer processor to: receive registration information of a membership name by a member for a membership based organization; receive information about the member from a plurality of network users; combine the information as aggregate registration information representing crowd sourced content of the plurality of network users; generate a trusted network presence document of the network presence documents to include at least a portion of the aggregate registration information as read only content with respect to the member, such that the member is restricted from customizing the read only content; create a link between a profile document and the trusted network presence document of the network presence documents, the link configured for placement on at least one of the network presence documents such that the profile document and the trusted network presence document would be linked to one another, the profile document to include customizable content with respect to the member such that the member is allowed to customize the customizable content; and publish the trusted network presence document on the network.

A third aspect provided is a system for providing a directory service for generating network presence documents made available on a network, the system comprising: a computer processor and memory having instructions stored thereon for implementation by the computer processor to: receive registration information of a membership name by a member for a membership based organization; provide access to information about the member to a plurality of network users, the information being aggregate registration information representing crowd sourced content; receive individual votes from the plurality of network users on the aggregate registration information for a specified character of the aggregate registration information; generate a trusted network presence document of the network presence documents to include at least a portion of the aggregate registration information as read only content with respect to the member, such that the member is restricted from customizing the read only content; create a link between a profile document and the trusted network presence document of the network presence documents, the link configured for placement on at least one of the network presence documents such that the profile document and the trusted network presence document would be linked to one another, the profile document to include customizable content with respect to the member, such that the member is allowed to customize the customizable content; and publish the trusted network presence document on the network.

A fourth aspect provided is a system for providing a directory service for generating network presence documents made available on a network, the system comprising: a computer processor and memory having instructions stored thereon for implementation by the computer processor to: receive registration information of a membership name by a member for a membership based organization; provide access to information about the member to a plurality of network users, the information being aggregate member information representing crowd sourced content; receive individual votes from the plurality of network users on the aggregate member information for a specified character of the aggregate member information; generate a trusted network presence document of the network presence documents to include at least a portion of the aggregate member information as read only content with respect to the member, such that the member is restricted from customizing the read only content; create a link between a profile document and the trusted network presence document of the network presence documents, the link configured for placement on at least one of the network presence documents such that the profile document and the trusted network presence document would be linked to one another, the profile document to include customizable content with respect to the member, such that the member is allowed to customize the customizable content; and publish the trusted network presence document on the network.

A fifth aspect provided is a system for providing a directory service for generating network presence documents made available on a network, the system comprising: a computer processor and memory having instructions stored thereon for implementation by the computer processor to: receive registration information of a membership name by a member for a membership based organization; parse the registration information to obtain a set of keywords; search the network using the set of keywords for publically available information about the member; create member information based on information obtained from the search using the set of keywords; generate a trusted network presence document of the network presence documents to include at least a portion of the member information as read only content with respect to the member, such that the member is restricted from customizing the read only content; generate a profile document of the network presence documents, the profile document to include customizable content with respect to the member such that the member is allowed to customize the customizable content; and publish the network presence documents on the network.

A sixth aspect provided is a system for providing a directory service for generating network presence documents made available on a network, the system comprising: a computer processor and memory having instructions stored thereon for implementation by the computer processor to: receive registration information of a membership name by a member for a membership based organization; receive information about the member from a plurality of network users; combine the information as aggregate member information representing crowd sourced content of the plurality of network users; generate a trusted network presence document of the network presence documents to include at least a portion of the aggregate member information as read only content with respect to the member, such that the member is restricted from customizing the read only content; create a profile document of the network presence documents, the profile document including customizable content with respect to the member such that the member is allowed to customize the customizable content; and publish the network presence documents on the network.

A seventh aspect provided is a system for providing a directory service for generating network presence documents made available on a network, the system comprising: a computer processor and memory having instructions stored thereon for implementation by the computer processor to: receive registration information of a membership name by a member for a membership based organization; provide access to information about the member to a plurality of network users, the information being aggregate member information representing crowd sourced content; receive individual votes from the plurality of network users on the aggregate member information for a specified character of the aggregate member information; generate a trusted network presence document of the network presence documents to include at least a portion of the aggregate member information as read only content with respect to the member, such that the member is restricted from customizing the read only content; create a profile document the network presence documents, the profile document including customizable content with respect to the member such that the member is allowed to customize the customizable content; and publish the network presence documents on the network.

DETAILED DESCRIPTION OF THE PREFERRED EMBODIMENT(S)

Referring to FIG. 1, shown is a network presence registration system 10 providing for a unique member 12 of a membership based organization 16 (e.g. social media organization, etc.) to request and obtain over a communications network 11 a membership name 14 from the membership based organization 16 for the membership name 14 available (e.g. not yet claimed) in an organization registry 18 (e.g. a database or directory of all unique membership names 14 and associated network presence documents 24 registered in the membership based organization 16 by having assigned a unique member identification (ID), in other words each unique member ID is different from each other unique member ID in the membership based organization), which can be managed by the membership based organization 16. One example is where the membership name 14 is the unique member ID. The membership based organization 16 can also interact with a directory subscription service 22 responsible for generating and maintaining network presence documents 24 (e.g. the documents 24 can be hosted by the membership based organization 16 and/or the directory subscription service 22) associated with membership name 14 obtained by the unique member 12. It is recognized that the unique member 12 itself can communicate directly with the directory subscription service 22 for the registration information 26 used in generation of the network presence documents 24, and/or can communicate the registration information 26 indirectly with the directory subscription service 22 via the membership based organization 16. Further, the membership based organization 16 can supply any requested registration information 26 to the directory subscription service 22 on behalf of the unique member 12. As such, once published on network 11, network 11 users can access network presence documents 24 via the network 11 and accordingly access content 42,43 of the network presence documents 24. An example of such access is the network 11 users using a network-based application (e.g. a web browser in the case of the Internet) to navigate on network 11 to network presence documents 25 and display the content 42,43 of the documents 24 on a user interface of their computer device.

One example of the network presence document 24 is a Web page available via a web browser, such that the network 11 is the Internet, and the unique member 12 is a domain name registrant, the membership name 14 is a domain name, the membership based organization 16 is a registrar or registry of domain names, and the organization registry 18 is a domain name registry. Another example of the network presence document 24 is a network document (e.g. Facebook™ account or page) accessible over the network 11 using a network browser, such that the network 11 is an intranet and/or extranet implemented as a private network and/or over the public Internet, the unique member 12 is one of a plurality of members in the organization 16 (e.g. a user of a social media site such as Facebook™, Twitter™, etc.), the membership name 14 is the member name (also referred to as user profile/account) assigned or otherwise registered with the organization 16, and the organization registry 18 is database having information on all members and their registered profiles/accounts with the organization 16.

A network presence document 24 is a network document that is suitable for access by a user on the network 11 via the network browser (e.g. an application running on a user computer device that is connected via the network 11 as a client of an organization computer device acting as a server). The network browser is configured to display the network presence documents 24 on a monitor or mobile device interface of the network user. The network document 24 (e.g. web page) is what is displayed, but the term can also refer to a computer file, for example written in HTML or comparable markup language. Network browsers coordinate the various network resource elements for the written network presence documents 24, such as style sheets, scripts, and images, to present the network documents 24. It is recognised that the network documents 24 can include document navigational elements (e.g. bar or a sidebar menu) to other network documents 24 via network navigational elements (e.g. hyperlinks), often referred to as links. On the network 11, the network browser can retrieve the network presence documents 24 from a remote network server (e.g. expressed as a service of the membership based organization 16 and/or the directory subscription service 22 itself). On a higher level, the network server of the membership based organization 16 and/or the directory subscription service 22 can restrict access to only a private network 11 such as a corporate intranet or provide access to the World Wide Web. On a lower level, the network browser uses markup based languages (e.g. HTTP) to make such requests. Further, a static network document 24 is delivered exactly as stored, as network content in the network server's file system (e.g. organization registry 18), while a dynamic network document 24 is generated by a network application that is driven by server-side software or client-side scripting on behalf of the membership based organization 16. Dynamic network documents 24 can provide the network browser (the client) to enhance the network document through user input to the server.

As such, the network presence documents 24 (e.g. Facebook™ page) can be a public (or private) profile specifically created by the member 12 for businesses, brands, celebrities, causes, and other organizations. The network presence documents 24 can work similarly to network profiles, updating network users with things such as statuses, links, events, photos and videos provided as content 42,43 of the network presence documents 24 accessible via the network 11. This information content 42,43 appears on the network presence document 24 itself, which can include information (e.g. news) feeds, etc. The network presence documents 24 can be referred to as are computer-mediated tools that allow users (e.g. individuals or companies) to create, share, or exchange information, career interests, ideas, and pictures/videos in virtual communities and networks. The network presence documents 24 facilitate, via the network browser—content server interactions, the creation and exchange of user-generated content. Furthermore, network presence documents 24 can depend on mobile and network-based technologies to create highly interactive platforms through which individuals and communities share, co-create, discuss, and modify generated content 42,43.

Network documents 24 can include information as to the colors of text and backgrounds and can contain links to images and sometimes other types of media to be included in the final view of the network document 24 as rendered by the network browser. Layout, typographic and color-scheme information can be provided by instructions, which can either be embedded in the programming language used to express the network document 24 or can be provided by a separate file, which is referenced from within the programming language. Further, images can be stored on the network server (e.g. in the registry 18) as separate files, but it is recognised that that once the network document 24 is downloaded to the network browser (e.g. operated by the network user), related files such as images and style sheets can be requested as the network document 24 is rendered/processed. For example, the network server can maintain a network connection with the network browser until all related resources have been requested and provided for the network document(s) 24 accessed by the network browser from the network server. The network browser can render images along with the text and other material (e.g. audio, video, etc.) on the network document 24 displayed on the users mobile device running the network browser. It is recognised that the network 11 users can be members 12 themselves accessing other membership names 14 (and associated network presence documents 24) provided by the organization 16.

The communications network 11 can comprise a wide area network such as the Internet, however the network 11 can also comprise one or more local area networks 11, one or more wide area networks, or a combination thereof. Further, the network 11 need not be a land-based network, but instead can comprise a wireless network and/or a hybrid of a land-based network and a wireless network for enhanced communications flexibility. For example, the communications network 11 can also include Bluetooth™ associated elements. It is recognised that membership based organization 16, the organization member 14, and the directory subscription service 22 can be implemented on computer devices 100 (see FIG. 3) such as servers and can communicate with one another via the network 11 in client-server relationships. The network 11 can be a public or private network as desired.

On the network 11, a Uniform Resource Identifier (URI) can be used by the network browser as a string of characters used to identify a resource (i.e. network presence document 24) on the network 11. Such identification enables interaction with representations of the resource over the network 11 via the server using specific network protocols. Schemes specifying a concrete syntax and associated protocols define each URI known to both the network browser and the network server. A common form of URI for the network 11 as the Internet is the Uniform Resource Locator (URL), also referred to informally as a web address. For example, a URL can be referred to as a URI that points to a physical resource (i.e. network presence document 24) over the network 11.

In general, the membership name 14 can be referred to as an identification string that defines a realm of administrative autonomy, authority, or control on the network 11, whereby the membership names 14 are formed by the rules and procedures of the organization registry 18 coordinated by the membership organization 16. The membership names 14 can be used in various networking 11 contexts and application-specific naming and addressing purposes on the network 11 and/or within the membership based organization 16 itself.

The membership name 14 can be utilized as the network resource on the network 11, used by a personal computer (of the network user) to access via the network 11 any network presence documents 24 associated with the membership name 14 served by a server computer hosting the organization 16 network site, or any other service communicated via the network 11. For example, the membership name 14 can be a component of a URI used to access the network presence documents 24 over the network 11, for example: URL—http://www.example.info/index.html. Referring again to FIG. 1, the registry 18 contains those membership names 14 that are registered in the membership based organization 16.

Membership names 14 can be formed from the set of alphanumeric ASCII characters (a-z, A-Z, 0-9), but characters can be case-insensitive. In addition the hyphen can be permitted if it is surrounded by a characters or digits, i.e. it is not the start or end of a label. Labels can be separated by the full stop (period) character in the textual name representation. It is recognized that the membership names 14 can be represented using characters based in other languages as well, including alternate formats as appropriate, as desired.

Figure 2:
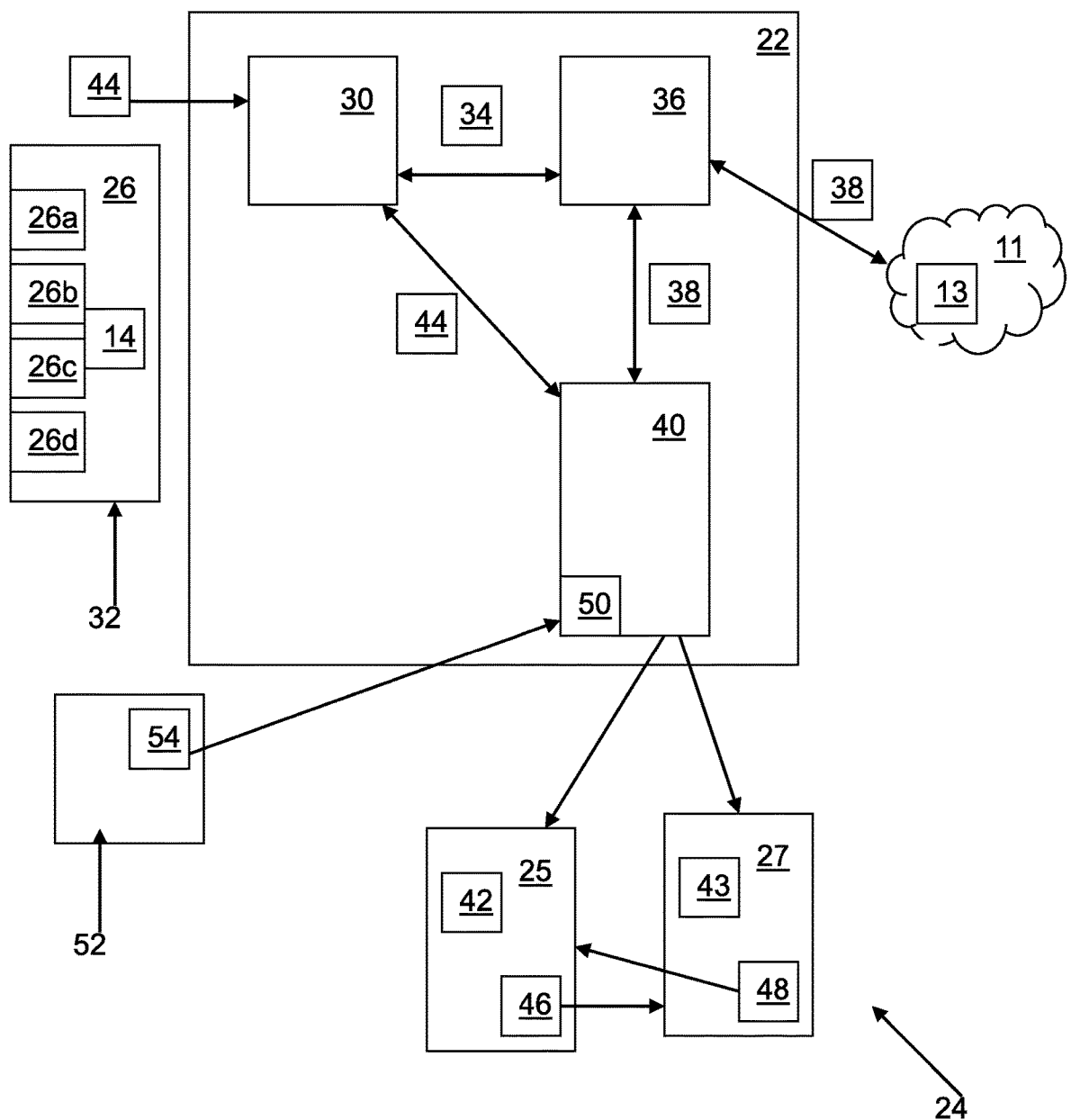
FIG. 2 is a block diagram of an example directory subscription service for the system of FIG. 1.

Referring to FIGS. 1 and 2, shown is directory subscription service 22 responsible for generation of the network presence documents (e.g. pages) 24, which are accessible via a specified URI (over the network 11) incorporating the membership name 14, maintained in registry 18 using an appropriate network communications protocol (e.g. TCP/IP, HTTP, HTTPS, etc.). For example, the network communications protocol can include rules for data formats for data exchange and rules for network address formats for data exchange that identify both the sender network 11 address and the intended receiver(s) network 11 address. In computing, the URI can be referred to as a string of characters used to identify a name or a resource. Such identification enables interaction with representations of the resource over the network 11 (e.g. the World Wide Web) using the specific protocols. Schemes specifying a concrete syntax and associated protocols define each URI, such that URIs can be classified as locators (URLs), as names (URNs), or as both.

A uniform resource name (URN) functions like a person's name, while a uniform resource locator (URL) resembles that person's street address. In other words: the URN defines an item's identity, while the URL provides a method for finding the item over the network 11.

From the point of view of a visitor to network presence documents 24, the content (e.g. content 42 and content 43) of network presence documents 24 will be perceived by the visitor as an uber-social media site and trusted source of information (e.g. trusted network presence document(s) 25). The objective of network presence documents 24 is to provide a trusted one-stop source for links and access to information and services about a membership name's registration in the organization 16. For organizations 16 focused on organizational registrations, the directory subscription service 22 can offer effective and significant brand protection to the members 12 (e.g. organization) of the membership name 14. This can be especially valuable to small and medium sized organizations, as well as organizations with limited resources to develop and manage a brand. Network presence documents 24 provided by the directory subscription service 22 can provide a jumping off platform to external details of member 12 that can mitigate phishing and abuse attacks if it is always used as a starting point of contact on network 11.

It is recognized that the directory subscription service 22 provides or otherwise hosts the network presence documents 24 made available to users of the network 11, in order to provide access to network-published content associated with the membership name 14 of interest sought by the network user. For example, the network presence documents 24 and associated content can be provided to the network 11 by the directory subscription service 22 as files uploaded via File Transfer Protocol (FTP) or a Web interface of the network 11 (e.g. the Internet). The files representing the network presence documents 24 can be delivered to the network 11 "as is" or with some processing. The network presence documents 24 for a member 12 (e.g. membership name owner) can be provided as a single document hosted or as a more complex series of documents and associated network/document navigational links between the documents supported via the database and application development platforms (e.g. PHP, Java, Ruby on Rails, ColdFusion, or ASP.NET). However, it is recognized that the application development platforms, when pertaining to content of their network presence documents 24, inhibits the member 12 (e.g. membership name 14 owner) from writing or installing scripts for applications like forums and content management published on the network presence documents 24, as further described below. As such, the directory subscription service 22, for any content published on the network presence documents 24, provides none or limited interfaces or control panels to the member 12 (e.g. membership name 14 owner) for managing the network server and installing scripts, as well as other modules and service applications like e-mail, as the permanent information (content 42 and/or content 43) is perceived by users of the network 11 as independent or trusted information about the member 12 that is independent from manipulation of any substantive portions of the content 42,43 that is considered as trusted content (member information 38 generated and published on the trusted network presence document(s) 25) as further described below.

The data model for content 42 and content 43 can have a number of different classifications of information, e.g. permanent, transient, and/or temporal). Permanent information (content 42 and/or content 43) is data that is discovered and imported directly to a local database 23 of directory subscription service 22. An example of this type of data is the registration information 26. For example, permanent information that is physically stored in database 23 can be updated periodically (e.g. daily), confirmed to help ensure accuracy and completeness. Transient information (content 42 and/or content 43) is data that is acquired when needed. An example of this type of data is a news feed. Temporal information (content 42 and/or content 43) is data that stored in the local database 23 but is only retained for a specific period of time, after which the information is removed.

Further, it is recognized that directory subscription service 22 can be embodied as separate from the membership based organization 16 or can be embodied as a service hosted (not shown) by the membership based organization 16 itself, as desired. Directory subscription service 22 generates network presence documents 24 based on registration information 26 obtained from the organization 16 and/or member 12, as received via a registration module 30 as a subscription request 32.

Example content of registration information 26 can include several pieces of information connected with the membership name 14, for example: 1) administrative contact information 26a (e.g. contact name, address, etc.) defining a designated administrative contact to manage the membership name 14 including management of all business information, such as name of record, postal address, and contact information of the official owner of the membership name 14 and the obligation to conform to the requirements of the registry 18 in order to retain the right to use the membership name 14, as well as installing additional contact information for technical, notification and billing functions; 2) technical contact information 26b (e.g. contact name, address, etc.) defining a designated technical contact to manage the servers of the membership name 14 including assuring conformance of the configurations of the membership name 14 with the requirements of the registry 18, maintaining the membership name 14 records, and providing continuous functionality of the servers (that lead to the accessibility of the membership name 14 and associated network presence documents 24 over the network 11); 3) billing contact information 26c (e.g. contact name, address, etc.) defining a designated party responsible for receiving billing invoices from the organization 16 and paying applicable fees.

Registration module 30 parses subscription request 32 of registration information 26 to reduce registration information 26 to a set of keywords 34 provided to a search module 36 that will be used to search network 11 (or external networks 11) for member information 38 relevant to keywords 34. Member information 38 can be obtained from network 11 in general without restriction and/or can be obtained from specified sources 13 (trusted information sources that are unbiased towards member 12, examples of such would be sources independent from member 12 such as social media sources and/or news feed sources) accessible via network 11. As member information 38 is found, it is provided to a document generation module 40 for use in generating network presence documents 24.

It is recognized that the process of obtaining member information 38 relevant to keywords 34 by search module 36, and generation/amendment of content 42 of network presence documents 24, can be implemented on an ongoing basis as long as membership name 14 is subscribed. In one embodiment, operationally, search module 36 actively seeks public information available on network 11 about membership name 14 registration on an ongoing basis. This can be accomplished through automated network crawlers that seek out and maintain the timeliness of identified member information 38 on a defined periodic basis such as daily, by example. Additionally or alternatively, search module 36 can be configured to receive notifications containing member information 38 from third party information suppliers (e.g. Google™ alerts, Facebook™ alerts, etc.). It is also recognized that, optionally, content 42 of trusted network presence document(s) 25 can be generated to include additional private information from private sources (i.e. information not publically available on network 11).

A network 11 (e.g. web) crawler is a computer program that browses the network in a methodical, automated manner or in an orderly fashion. This process of network browsing for member information 38 is called network crawling or spidering. Spidering can be used as a means of providing up-to-date data for member information 38. Network crawlers are mainly used to create a copy of all the visited network content (e.g. documents) for later processing that will index the downloaded network content to identify relevant member 12 information 38 for use as updating or otherwise adding to content 42 of network presence documents 24. A Web crawler is one type of bot, or software agent. In general, it starts with a list of URLs to visit, called the seeds. As the crawler visits these URLs, it identifies all the hyperlinks in the document and adds them to the list of URLs to visit, called the crawl frontier. URLs from the frontier are recursively visited according to a set of policies.

As such, the content 42 can represent data content that is part of a network document (e.g. a web page), data content that is linked to the network document via network 11 navigational mechanisms (e.g. hyperlinks), data content that is part of network 11 resolution support architecture of the network document, etc. It is also recognized that the content 42 can contain information concerning indicators of high or low significance, for example the number of network 11 information sources other than the network presence documents 24 containing similar content 42, number of or type of network 11 sources relied upon to gather the document content 42, etc. It is also recognized that spatial positioning of the content 42 on the network presence documents 24 can be used to signify degree of relevance and conventional viewpoints of a community (e.g. peers, customers, competitors, etc.) associated with the content 42 displayed on or otherwise linked to the network presence documents 24. For example, top and center positioned content 42 information on the network presence documents 24 can be considered as implicitly contained a network 11 level popular viewpoint (greater frequency of occurrence on other network 11 content outside of the network presence documents 24) of the member's company/business/service quality, etc.

Examples of member information 38 can include information such as but not limited to: public information about the member 12 available on the network 11; news feeds; references to external network sites; blog entries; social media content from social media sites (e.g. Facebook, LinkedIn, and Twitter); content from trusted sources that are independent from member 12 or are otherwise considered as unbiased towards member 12; and any other information that can be acquired regularly and in a uniform format. Unbiased can be defined as free from bias, free from all prejudice and favoritism, eminently fair, and/or having views that include both positive and negative aspects towards member 12, etc. Independent can be defined as an individual or organization that is unaffiliated with member 12.

For example, network crawlers can be used to gather specific types of member information 38 from visited network content, in order to collect public information about a registration, organize it, and display it on a trusted network presence document(s) 25 of network presence documents 24. Trusted network presence document(s) 25 is defined as one or more base documents (e.g. pages) from which all other services and tools offered by directory subscription service 22 can be accessible via links (e.g. hyperlinks) present on the trusted network presence document(s) 25 that can be accessed by network 11 users to navigate to other network content associated with the other network presence documents 24 (or other documents connected thereto). In one embodiment, the public information obtained from network 11 in member information 38 is displayed as content 42 as is on trusted network presence document(s) 25, such that member 12 of membership name 14 containing content 42 will have inhibited control over the public information that is collected and displayed on the trusted network presence document(s) 25. In this manner, customization module 50 of document generation module 40 restricts (e.g. inhibits) customization of content 42 by member 12. The provision of trusted network presence document(s) 25 of network presence documents 24 provides to visitors a trusted and organized display of information about membership name 14 registration (and member 12) and services with which to interact with member 12 (or designee).

Member information 38 can be obtained from network 11 in general without restriction and/or can be obtained from specified sources 13 (trusted information sources that are unbiased towards member 12, examples of such would be sources independent from member 12 such as social media sources and/or news feed sources) accessible via network 11. Trusted network presence document(s) 25 has content 42 that is generated by from member information 38 provided by search module 36. Search module 36 can include a network 11 search algorithm (e.g. network spider as discussed above).

It is also recognized that search module 36 can be configured to implement crowd sourced content as member information 38, such that specified sources 13 can include a plurality of network 11 users (The Crowd) who can present their member information 38 content to the search module 38 and optionally grade or otherwise vote on member information 38 content of other participants of the Crowd. Crowd sourcing of member information 38 by search module 38 can be defined as a process of obtaining member information 38 by soliciting individual contributions from a large group of people (i.e. network 11 users considered as an online community of the network 11). Crowd sourced member information 38 represents combined efforts of numerous self-identified network 11 users, where each contributor, acting on their own initiative, adds a portion of member information 38 that combines with those of other network users 11 to achieve an aggregate member information 38 that is included in content 42. It is recognized that aggregate member information 38 can be obtained by search module 36 as: a result of direct solicitation (e.g. an information request sent by search module 36 over network 11 and received by particular network 11 user(s) who submit member information 38 in response back to search module 36); a result of voluntarily contributed content (e.g. information sent to search module 36 over network 11 by particular network 11 user(s) who submit member information 38 to search module 36); and/or a combination thereof. It is also recognized that aggregate member information 38 can include content obtained by the network crawler from publically available network content (e.g. blog content of network 11 user(s)) matching one or more key search terms utilized by the network crawler as specified by search module 36.

As such, one form of member information 38 is an aggregate of content obtained from a plurality of network 11 users specified as belonging to the Crowd by the search module 36. For example, a Crowd category of specified users 13 can be those network 11 users that remain unsubscribed to subscription service 22. For example, a Crowd category of specified users 13 can be those network 11 users that are subscribed to subscription service 22. In any event, it is recognized that network 11 users specified as belonging to the Crowd are regarded as sources independent from member 12. The Crowd is considered an umbrella term for the network 11 users who contribute to aggregate member information 38, such that network users 11 are identified as belonging (i.e. a Crowd content category) to the Crowd by the search module 36.

Demographic data (e.g. representative identification information each of network 11 user of the Crowd) can be collected by the search module 36 and associated with the aggregate member information 38, such that demographic data can be combined as part content 42 included in trusted network presence document(s) 25. For example, demographic data can include: identification of network 11 user gender; age; geographical region domicile; profession; employment status, marital status, citizenship, specified organization(s) membership; member of subscription service 22 or not, education level, nationality, religion, and/or ethnicity, for example. Demographic data collected by search module 38 of the community of network 11 users associated with aggregated member information 38 can be included in content 42 displayed on trusted network presence document(s) 25. The demographic data can be provided actively by the network 11 user(s) in combination with their submitted member information 38 content to search module 36 and/or can be obtained by search module 36 separate from (the network 11 user is previously known to search module 36—e.g. in a registration database of subscription service 22) the submission of the network 11 user of member information 38 content to search module 36.

Further, member information 38 (e.g. collected external to Crowd sourcing) and/or aggregate member information 38 (e.g. collected by Crowd sourcing) can be voted on by network 11 users. The voting process can be coordinated by search module 36 by notifying the network 11 users of member information 38 or aggregate member information 38 available for evaluation through a formal voting process. Through the formal voting process (i.e. Crowd Voting), search module 36 can gather and summarize a large group's (e.g. plurality of the network 11 users) opinion and judgment on a specified member information 38 and/or aggregate member information 38. As such, it is recognized that collected votes (by search module 36) from the network 11 users can pertain to aggregate member information 38 containing content provided by the network 11 users voting on the aggregate member information 38. Alternatively, it is recognized that collected votes (by search module 36) from the network 11 users can pertain to aggregate member information 38 that is independent (e.g. does not contain) content provided by the network 11 users voting on the aggregate member information 38. Alternatively, it is recognized that collected votes (by search module 36) from the network 11 users can pertain to member information 38 that is independent (e.g. does not contain) content provided by the network 11 users voting on the aggregate member information 38, in other words member information 38 being voted on contains content from specified sources 13 other than the network 11 users voting on the member information 38.

An example voting process coordinated by search module 36 can be as follows: 1) receive content pertaining to member information 38; solicit voting (e.g. send each of the network 11 users a voting request over network 11, post on network presence documents 24 or other documents of subscription service 22 the content of member information 38 for voting for subsequent access by network 11 users interested in providing opinion on the posted member information 38 available for vote) from a plurality of network 11 users on a specified (by search module 36) character of member information 38; receive a plurality of votes on the content pertaining to member information 38 from a plurality of the network 11 users; and tally the plurality of votes. Search module 36 could further compare the vote tally against a predefined vote threshold (e.g. stored in storage 23). A result of the comparison (e.g. matching or not the threshold) could be presented to the network 11 of users over network 11. Alternatively or in addition to, the result of the comparison could be used by search module 36 as a decision making tool to incorporate member information 38 into content 42 or not. For example, if the result of the comparison is that the member information 38 does not satisfy the predefined vote threshold then the member information 38 voted on would be excluded from content 42. For example, if the result of the comparison is that the member information 38 does satisfy the predefined vote threshold then the member information 38 voted on would be included in content 42. Further, it is also recognized that search module 36 could receive or otherwise solicit voting on content already included in content 42, i.e. content available on trusted network presence document(s) 25 by network 11 users via subscription service 22.

In terms of the specified character of member information 38, the character could be selected from character types such as but not limited to: veracity of member information 38; accuracy of member information 38; representativeness of member information 38 with member 12; and/or relevancy of member information 38 to member 12. For example, member information 38 can include organizational history (e.g. specified geographic regions of member influence, specified activities, level/degree of involvement with other external organizations, etc.) of member 12. The predefined vote threshold could be a numerical quantity, for example number of votes supporting the specified character of less than X % means that the member information 38 voted on is considered as non-relevant to the member 12. As provided above, the content voted on can be aggregate member information 38 that is dependent (e.g. does contain) content provided by the network 11 users voting on as aggregate member information 38. As provided above, the content voted on can be member information 38 that is independent (e.g. does contain) content provided by the network 11 users voting on as member information 38. As provided above, the content voted on can be aggregate member information 38 that is independent (e.g. does not contain) content provided by the network 11 users voting on as aggregate member information 38. As such, it is recognized that subscription service 22 administers the voting process, e.g. via search module 36 or any other appropriately configured module of subscription service 22, such that subscription service 22 is responsible for providing member information 38 (e.g. aggregate member information 38) for access by the network 11 users for voting as well as collecting the individual votes and subsequent processing of the votes and resulting action(s) pertaining to the member information 38.

It is recognized that the results of the vote could be included in content 42 and thus associated with member information 38 (e.g. aggregate member information 38) for display on trusted network presence document(s) 25. It is recognized that the results of the vote could be included in content 43 of profile document(s) 27 and thus associated with any content voted on for display on profile document(s) 27.

Trusted network presence document(s) 25 (e.g. pages) has/have content 42 that is generated by document generation module 40 from member information 38 identified by search module 36. Document generation module 40 and search module 36 cooperate to collect public information about a member and their membership name 14, organize it, and include it as content 42 for display on trusted network presence document(s) 25. Trusted network presence document(s) 25 has content 42 that is trusted by visitors because content 42 can be protected using industry standard best practices, or otherwise restricting access to the database contents of the registry 18 or 23 to specified database administrators).

Content 42 being trusted is an important element because it will provide assurance to visitors of trusted network presence document(s) 25 of the quality and provenance of the information contained within content 42. For example, content 42 can contain information that is "read only" by member 12 and therefore provides a true representation or picture of member 12 as perceived by various sources publically available on the network 11. As such, content 42 contains read-only information (with respect to member 12) that is an aggregation of unbiased and/or independent information obtained from network 11. In this manner, document generation module 40 restricts any customization (e.g. write ability) of content 42 by member 12 while at the same time allows customization of content 43 of profile document 27 by member 12, as further discussed below.

In terms of trusted network presence document(s) 25, read-only content 42 can be information such as but not limited to: (a) Subscriber contact information—this can be pre-seeded with the administrative contact information from the registration data; (b) Registration information—this will be a display of the information stored in database 18; (c) About information—if a membership name 14 site has an external network site (1 or more) associated with it and the "about document" for the external network site can be identified, then information from that document can be included; (d) Images slide show—if a membership name 14 site has an external network site (1 or more) associated with it, images from the site can be collected and available to visitors of the membership name 14 site as a slide show; (e) News feed—based on the keywords and category associated with member 12, one or more external news sources can be consulted to provide a news feed both directly and indirectly related to member 12; social media information—based on the keywords and category associated with member 12, one or more social media information sources can be consulted to provide social media information both directly and indirectly related to member 12; and/or (f) Map—based on the subscriber contact information a map can be created marking the geographical location of member 12 that can include physical address and contact information (e.g. including getting directions to the location).

Further to the above, in one embodiment member 12 can submit feedback/comment messages 44 containing "agree" and/or "disagree" statements for selected portions of member information 38 to module 30, for subsequent association and incorporation with the respective selected portions of member information 38 in content 42 of trusted network presence document(s) 25. This mechanism of comment can advantageously provide member with the ability to present their view of "read-only" content 42 as perceived by visitors. For example, in the case where an untrue (as considered by member 12) defamatory statement about member 12 is included in social media information incorporated in member information 38, member has the ability to provide their own comments towards the defamatory statement, thereby reinforcing the unbiased and trusted nature of content 42 as perceived by visitors. In this manner, the read-only content cannot be modified by member 12, however document generation module 40 can be configured to receive feedback/comment messages 44 and post the feedback/comment messages 44 along side (or otherwise associated) the unamended content 42, i.e. feedback/comment messages 44 are displayed concurrently with the read-only content 42 such that the information contained within content 42 remains unchanged by the addition of feedback/comment messages 44 with content 42. Accordingly, in view of the above, content 42 of trusted network presence document(s) 25 can provide for an aggregation of periodically updated public information about member 12 that is distributed over a number of sources on network 11, thus providing a visitor convenient site for accessing unbiased and/or independent information about member 12.

In terms of implementation of trusted network presence document(s) 25 by directory subscription service 22, trusted network presence document(s) 25 can be accessible via the appropriate URI for the network 11 in a number of different forms. In one embodiment, with respect to a URL for trusted network presence document(s) 25, the preferred choice is for the URL to be a three level domain (3LD), e.g., domain-name.IntDir.TLD, such that "IntDir" represents network 11 addressing for directory subscription service 22. In this configuration the SLD can be delegated to member 12 such that the member can use domain-name.TLD according to their own wishes. An alternate choice for the URL is for a registry operator to decide that directory subscription service 22 is the purpose of the domain name and thus it should be an SLD, e.g., domain-name.TLD. The distinction here is that the SLD is not delegated to member 12. Since a registry operator (e.g. membership based organization 16) hosts trusted network presence document(s) 25, the SLD will be delegated to directory subscription service 22 just as it would be in the 3LD choice. A potential disadvantage to this alternative is that it could be impractical to return to the typical configuration of having the SLD delegated to member 12.

It is recognized that if some of member information 38 is not available on network 11, then an indication of its unavailability is indicated in the network presence document(s) 25, for example as content 42. It is recognized that registration information 26 can be provided to module 30 independently from member 12 (e.g. by registry operator), such that member 12 is not a subscriber to directory subscription service 22. In this case, network presence documents 24 would consist of trusted network presence document(s) 25 and not a profile document 27 (further described below). Accordingly, only in the event of subscription by member to directory subscription service 22 would profile document 27 be created and linked to trusted network presence document(s) 25. The following terminology is used to describe elements of network presence documents 24 and their creation, namely: Member 12—the standard definition of this term in a membership name life cycle is used, i.e. it is the party who requested the creation of the membership name 14 registration in the registry 18; Subscriber—a subscriber is member 12 that has opted-in their membership name 14 to directory subscription service 22; Claimant—a claimant is a subscriber that is expressly associated with a party who will manage the subscription of membership name 14 with directory subscription service 22; and Visitor—a visitor is any party who interacts with any element (e.g. network presence documents 24) of directory subscription service 22 over network 11, for example using a network browser of their computer device.

As such, the trusted network presence document(s) 25 contains content 42 that is aggregated and generated by document generation module 40 from member information 38 identified by search module 36, which can include member information obtained via the public information sources on the network 11 which is of an independent nature/influence by the member. Document generation module 40 and search module 36 cooperate to collect public information about a member and their membership name 14, organize it, and include it as content 42 for display on trusted network presence document(s) 25. Trusted network presence document(s) 25 has content 42 that can be trusted by visitors because content 42 being trusted can provide assurance to visitors of trusted network presence document(s) 25 of the quality and provenance of the information contained within content 42. As such, network 11 navigational links present on the trusted network presence document(s) 25 can be relied upon by the network 11 user to navigate to other network 11 documents (e.g. profile document 27 linked to the trusted network presence document(s) 25) that can be considered as appropriate and contain content provided by and attributable to the member (i.e. owner) of the network presence documents 24. In other words, the network 11 user can rely upon document content and navigable links of the network presence documents 24 with respect to information accuracy and navigational security considerations.

Referring again to FIG. 2, network presence documents 24 can also include profile document(s) 27, such that trusted network presence document(s) 25 and profile document(s) 27 are directly linked to one another via network navigational mechanisms such as hyperlinks. As such, it is recognized that any navigational mechanisms on the trusted network presence document(s) 25 can be advantageously used by a network 11 user to navigate to other documents (e.g. profile document(s) 27) considered trusted as containing network document content sanctioned as appropriate and accurate by the member 12 of the network presence documents 24. A profile document related to a trusted network presence document(s) 24 can be obtained by a member upon subscription to directory subscription service 22. For example, profile document(s) 27 could contain a link 48 that when accessed directs the visitor to trusted network presence document(s) 25 and/or trusted network presence document(s) 25 could contain a link 46 that when accessed directs the visitor to profile document(s) 27. In this manner, visitor can be assured that profile document(s) 27 is associated with the read-only information content 42 resident trusted network presence document(s) 25 and vice versa. As such, utilization of the network presence documents 24 by the member 12, as either the only network published content for the member, or as part of a larger collection of network documents published by the member 12, to serve network content to network 11 users can advantageously provide the network 11 users with some assurance that the network content as well as any network functionality of the network documents is trustable and actually sanctioned by the member 12. This advantage of trustworthiness is considered important in today's world of numerous network sites and content that can be false or otherwise malicious in nature.

Profile document(s) 27 includes interactive services and features (as content 43) as provided or otherwise enabled by directory subscription service 22. Member 12 operating as a claimant can enable and disable (e.g. customize) portions of services and features (i.e. content 43) of profile document(s) 27, which is different as compared to the read-only interaction they have with content 42 of trusted network presence document(s) 25. Therefore, contrary to the content of the trusted network presence document(s) 25, application development platforms pertaining to content of their network documents 27 provides to the member 12 (e.g. membership name owner) writing or installing scripts for applications like forums and content management published on the network documents 27, as further described below. As such, the directory subscription service 22, for any content published on the network documents 27, provides interfaces or control panels to the member 12 (e.g. membership name 14 owner) for managing the Network server and installing scripts, as well as other modules and service applications like e-mail. The customization of content 43 can be provided by member 12 through customization messages 52 (containing additional content 54 and/or customization instructions 54) sent by member 12 to customization module 50 for use in dynamically updating content 43 of their profile document(s) 27.

Interactive services/features as content 43 are such that members 12 can specify additional content 54 and/or customization instructions 54 such as social media "like" and "follow" links, e.g., Facebook, LinkedIn, and Twitter as the content of profile document(s) 27. Additional content 54 and/or customization instructions 54 can be chat services included in interactive services/features so that visitors to profile document 27 can select a "live person" with whom to communicate regarding the network site represented by profile document 27. In terms of organizations involved with payment, additional content 54 and/or customization instructions 54 can be payment services made available so that visitors can direct funds to member 12. Further, profile document 27 can include additional content 54 and/or customization instructions 54 for services/features (e.g. email groups, search functions within the membership based organization of membership name 14, etc.) that provide for members 12 themselves to have a means to get introduced and self-organize with other similar or related members 12. The content 43 (e.g. additional content 54 and/or customization instructions 54) listed above are presented as examples and expressly do not limit the services and functionality to be explored and included in profile documents 27.

The profile documents 27 contain customizable content (i.e. services and features as content 43) that is provided by member 12 in messages 52 to directory subscription service 22 for interaction with visitors to their profile document 27. The content 43 can also include customizable content (e.g. in format and/or content and/or positional placement on their profile document 27) for: basic information regarding member 12 (e.g. in terms of an organization—their name, what they do, etc.); possible information from licensing organizations (or proof of verification); content and functionality similar to a social media (e.g. Facebook™) document for organization/group (one liner with status), which can be as simple as a direct link to a third party hosted social media document (facebook.com/domain-name.TLD) of the member to actually including content reposted from the third party hosted social media document; multimedia (photos, video, etc) obtained as content 43 obtained or otherwise sourced from member 12; basic static information of member 12 (logo, contact, external network site, etc) such that member has control over the format and/or content of the static information; donation mechanisms (in the case of charitable organizations); news or update activities (text or media, feeds, etc.) of member 12 as specified or otherwise uploaded by member 12 to directory subscription service 22 for presentation on profile document 27 of member 12; ability to provide direct links by member 12 in order to share third party hosted social media content via their profile document 27; social media linking (with button to add to expand) (e.g. Twitter™ feed, Facebook™, Flickr™, LinkedIn™).

It is also recognized that any network document navigation mechanisms (e.g. hyperlinks) included in the profile document(s) 27 can be added or amended by the member 12 using the network document 27 development tools as provided by the hosting server of the profile document 27. However it is noted that any navigational mechanisms of the profile document 27 linked to the trusted network presence document(s) 25 is provided as read only by the member 12. As such, similar to the trusted network presence document(s) 25 content, any navigation mechanisms linking to or from the trusted network presence document(s) 25 is also considered as permanent or otherwise trusted "content", thereby providing the network 11 user with a sense of trustworthiness for any network document navigation functionality leading to or from the trusted network presence document(s) 25.

It is recognized that profile document 27 can have a common template layout that can be pre-populated by generation module 40 using member information 38 as a starting point for content 43 from which member 12 can customize via customization module 50. Further, member 12 can augment content 43 using member 12 submitted tags and/or categorization of content 43 to customization module 50. Accordingly, member 12 has some limited control via customization module 50 over the information in content 43 that is displayed and can have access to enable and disable a number of additional services/features of content 43.

In an alternative embodiment, it is not required for a trusted network presence document(s) 25 to be claimed by member 12 through directory subscription service 22. However, in the case where member 12 is a claimant, once trusted network presence document(s) 25 is claimed member 12 (acting as claimant of trusted network presence document(s) 25) can then have some limited control over the information in content 43 that is displayed and can have access to enable and disable a number of additional services/features of content 43. In addition, the claimant can have access to a variety of statistics, alerts, and notifications to help them manage how their profile document 27 is perceived by the community-at-large. This ability for member 12 acting as claimant to customize or otherwise have access to their profile document 27 is dependent upon member claiming their trusted network presence document(s) 25.

One example is profile document 27 is generated with pre-populated information derived from member information 38 prior to member 12 claiming their trusted network presence document(s) 25, however customization of their profile document 27 is restricted (not allowed) by customization module 50 until after member 12 claims their trusted network presence document(s) 25. In a different example, profile document 27 is not generated (i.e. does not exist or is otherwise not available via the network 11) with pre-populated information derived from member information 38 prior to member 12 claiming their trusted network presence document(s) 25. Upon claiming their trusted network presence document(s) 25 (e.g. via registration or subscription to directory subscription service 22 by member 12), document generation module 50 would use member information 38 to pre-populate content 43 of their profile document 27 and also allow customization of content 43 of profile document 27 by member 12 (e.g. through customization module 50) as a result of member 12 claiming their trusted network presence document(s) 25. It is recognized that network content can include multi-media content as well as inter-network document navigation mechanisms/functionality.

As such, network 11 navigational links present on the profile document 27 can be relied upon by the network 11 user to navigate to other network 11 documents (e.g. other network sites associated with the member's business/service offerings, other network sites associated customers of the member amongst others that are part of the community(ies) of which the member belongs, designated/directed network 11 content compatible with the member's business and community viewpoint(s), etc.) that can be considered as appropriate and contain content associated with, provided by and/or attributable to the member (i.e. owner) of the network presence documents 24. In other words, the network 11 user can rely upon document content and navigable links of the profile documents 27 with respect to information accuracy, information relevancy, and/or navigational security considerations, as defined by the member 12.

Network 11 navigation can be defined as a process of navigating a network of information resources (e.g. network presence documents 24 as well as documents stemming to and from the network presence documents 24) associated with the member 12 in the World Wide Web 11 (or other communications network 11), which are organized as hypertext or hypermedia. The user interface by the network 11 user that is used to implement Network 11 navigation is a network browser provisioned in the user computer device. Examples of Network document navigation mechanisms can include different mechanisms as per below.

Network 11 navigations vary in styles between different network sites as well as within a certain site. The availability of different navigational styles allows for the information in the network site to be delivered easily and directly. This also differentiates between categories and the sites themselves to indicate what the vital information is and to enable the users access to more information and facts discussed within the network site. Across the globe, different cultures prefer certain styles for network navigations, allowing for a more enjoyable and functional experience as navigational styles expand and differentiate. Some common navigation system designs from an information seeking perspective include: Text Links (e.g. anchor text, link label, link text, or link title is the visible, clickable text in a hyperlink); Navigation Bar (e.g. navigation bar or (navigation system) is a section of a network site or online document intended to aid visitors in travelling through the online document); Sitemap (e.g. is a list of documents of a network site accessible to crawlers or users, as either a document in any form used as a planning tool for Network design, or a Network document that lists the documents on a Network site, typically organized in hierarchical fashion); Dropdown Menu (e.g. in computing with graphical user interfaces, a dropdown menu or drop-down menu or drop-down list is a user interface control GUI element ("widget" or "control"), similar to a list box, which allows the user to choose one value from a list); Flyout Menu (e.g. in computing with graphical user interfaces, a menu that flies out (either down or to the side) when you click or hover (mouseover) some GUI element); Named anchor (e.g. an anchor element is called an anchor because network designers can use it to anchor a URL to some text on a network document. When users view the network document in a browser, they can click the text to activate the link and visit the document whose URL is in the link).

Referring again to FIG. 2, generation module 40 provides for generation of the content of the network presence documents 24 using the member information 38 as well as any member supplied information 54 via messages 52. As an example embodiment, network presence documents 24 can be generated by generation module 40 (and profile document 27 amended by customization module 50) using a markup language, examples are structural markers such as tags or delimiters (e.g. HTML (HyperText Markup Language), XHTML (Extensible HyperText Markup Language), XML (Extensible Markup Language), etc.). Markup is typically omitted from the version of the text (e.g. content 42,43) that is displayed for end-user consumption of network presence documents 24. Some markup languages, such as HTML, have presentation semantics, meaning that their specification prescribes how the structured data (e.g. content 42,43) are to be presented, but other markup languages, like XML, have no predefined semantics. XHTML can be considered as a blend of HTML and XML capabilities.

As an embodiment of markup language used to construct network presence documents 24 by generation module 40, HTML is one of the document formats of the World Wide Web. HTML, which is an instance of SGML (Standard Generalized Markup Language) is a main markup language for displaying web documents and other information that can be displayed in a web browser. HTML is written in the form of HTML elements consisting of tags enclosed in angle brackets (like <html>), within the web document content (e.g. content 42,43). The purpose of a web browser (of the visitor) is to read HTML documents (of web presence documents 24) and use the HTML and associated delimited content (e.g. content 42,43) to interpret and compose text, images and other material (e.g. content 42,43) into visual or audible web document content (of network presence documents 24). The browser of the visitor does not display the HTML tags, but uses the tags to interpret the content (e.g. content 42,43) of web presence documents 24. Therefore, HTML elements can be used to form the building blocks of content (e.g. content 42,43) of network presence documents 24. HTML can provide for images and objects (e.g. content 42,43) to be embedded and can be used to create interactive forms. HTML can provide a means to create structured documents by denoting structural semantics for text (e.g. content 42,43) such as headings, paragraphs, lists, links, quotes and other items. HTML can embed scripts (e.g. content 42,43) in languages such as JavaScript which affect the behavior of HTML network presence documents 24. Web browsers can also refer to Cascading Style Sheets (CSS) to define the appearance and layout of text and other material (e.g. content 42,43). It is recognized that the structural markers of the markup language (e.g. HTML) can be included in messages 52 for use by customization module 50 in customization of content 43.

Access to network presence documents 24 by network 11 users can be provided by the membership based organization 16 and/or directory subscription service 22 responsible for generating and maintaining network presence documents 24 (e.g. the document(s) 24 can be hosted by the membership based organization 16 and/or the directory subscription service 22). For example, registration module 40 (or another appropriately configured module), operated by membership based organization 16 or directory subscription service 22, can be configured to control access by the network 11 users of content 42,43 on network presence documents 24. For example, registration module 40 would have access to respective access credentials associated in storage 18,23 with each set of network presence documents 24. The access credentials (e.g. user name and password, specified user role, etc.) could define what portion of the content 42,43 is allowed access to by the network 11 user. For example, any content classified as public could be accessed by any of the network 11 users (e.g. content 42,43 not associated with a specified or unique set of access credentials). For example, any content 42,43 classified as private (e.g. content 42,43 associated with a specified or unique set of access credentials) could be accessed only by a restricted set of network 11 user(s) (of the plurality of network 11 users) providing the required access credentials to the registration module 40. Further, any content 42,43 classified as member (e.g. content 42,43 associated only with the member 12 using a specified or unique set of access credentials) could be accessed only by the member 12 when providing the required access credentials to the registration module 40.

As such, all or a portion of the content 42,43 of the network presence documents 24 could be available as public access to the network 11 users. Alternatively or in addition to, all or a portion of the content 42,43 of the network presence documents 24 could be available as private access to the network 11 users who present a validated (by the registration module 40) set of access credentials before gaining access to the restricted content 42,43. Alternatively or in addition to, all or a portion of the content 42,43 of the network presence documents 24 could be available as member access to member 12 who presents a validated (by the registration module 40) set of member access credentials before gaining access to the member restricted content 42,43. An example of public access could be access to content 42,43 by any general network 11 user not registered, recognized or otherwise associated with member 12, i.e. the network 11 user not having had assigned or otherwise having no knowledge of a predefined set of access credentials associated with network presence documents 24 (e.g. known to registration module 40). An example of private access could be access to content 42,43 by any network 11 user registered, recognized or otherwise associated with member 12, i.e. the network 11 user having had assigned or otherwise having knowledge of a predefined set of access credentials associated with network presence documents 24 (e.g. known to registration module 40). An example of member access could be access to content 42,43 by member 12 registered, recognized or otherwise associated with network presence documents 24, i.e. member 12 having assigned or otherwise having knowledge of a predefined set of member access credentials associated with network presence documents 24 (e.g. known to registration module 40).

In this manner, an advantage of using access credentials to gain access to all or a portion of content 42,43 is that selected portion(s) of content 42,43 can be coordinated by member 12 for personal, public, or private consumption.

In view of the above descriptions of storage 18,23 for the computer devices 100 (see FIG. 3) of membership based organization 16 and directory subscription service 22, storage 18,23 can be configured as keeping the stored data (e.g. membership name 14, network presence documents 24 respectively) in order and the principal (or only) operations on the stored data are the addition/amendment of or removal of the stored data from storage 18,23 (e.g. FIFO, FIAO, etc.). For example, storage 18,23 can be a linear data structure for containing and subsequent accessing of the stored data and/or can be a non-linear data structure for containing and subsequent accessing of the stored data.

Further, storage 18,23 receives various entities such as data that are stored and held to be processed later. In these contexts, storage 18,23 can perform the function of a buffer, which is a region of memory used to temporarily hold data while it is being moved from one place to another (i.e. between the between computer devices 100). Typically, the data is stored in the memory when moving the data between processes within/between one or more computers. It is recognised that storage 18,23 can be implemented in hardware, software, or a combination thereof. The storage 18,23 is used in the network system 10 when there is a difference between the rate/time at which data is received and the rate/time at which the data can be processed (e.g. ultimately by the devices 100).

Further, it will be understood by a person skilled in the art that memory/storage 18,23 described herein is the physical place where data can be held in an electromagnetic or optical form for access by the computer processors/modules. There can be two general usages: first, memory is frequently used to mean the devices and data connected to the computer through input/output operations such as hard disk and tape systems and other forms of storage not including computer memory and other in-computer storage. Second, in a more formal usage, memory/storage 18,23 has been divided into: (1) primary storage, which holds data in memory (sometimes called random access memory or RAM) and other "built-in" devices such as the processor's L1 cache, and (2) secondary storage, which holds data on hard disks, tapes, and other devices requiring input/output operations. Primary storage can be faster to access than secondary storage because of the proximity of the storage to the processor or because of the nature of the storage devices. On the other hand, secondary storage can hold much more data than primary storage. In addition to RAM, primary storage includes read-only memory (ROM) and L1 and L2 cache memory. In addition to hard disks, secondary storage includes a range of device types and technologies, including diskettes, Zip drives, redundant array of independent disks (RAID) systems, and holographic storage. Devices that hold storage are collectively known as storage media.

A database is one embodiment of memory 18,23 as a collection of information that is organized so that it can easily be accessed, managed, and updated. In one view, databases can be classified according to types of content: bibliographic, full-text, numeric, and images. In computing, databases are sometimes classified according to their organizational approach. The most prevalent approach is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses. Computer databases typically contain aggregations of data records or files, such as sales transactions, product catalogs and inventories, and customer profiles. Typically, a database manager provides users the capabilities of controlling read/write access, specifying report generation, and analyzing usage. Databases and database managers are prevalent in large mainframe systems, but are also present in smaller distributed workstation and mid-range systems such as the AS/400 and on personal computers. SQL (Structured Query Language) is a standard language for making interactive queries from and updating a database such as IBM's DB2, Microsoft's Access, and database products from Oracle, Sybase, and Computer Associates.

Memory/storage 18,23 can also be defined as a physical electronic holding place for instructions and data that the computer's microprocessor can reach quickly. When the computer is in normal operation, its memory usually contains the main parts of the operating system and some or all of the application programs and related data that are being used. Memory is often used as a shorter synonym for random access memory (RAM). This kind of memory is located on one or more microchips that are physically close to the microprocessor in the computer.

In terms of a server, it is recognised that the computer devices 100 can be configured as hardware, software, or typically a combination of both hardware and software to provide a network entity that operates as a socket listener. It is recognised that any computerised process that shares a resource (e.g. data) to one or more client processes can be classified as a server in the network system 10. The term server can also be generalized to describe a host that is deployed to execute one or more such programs, such that the host can be one or more configured computers that link other computers or electronic devices together via the network 11. The computer devices 100 implementing functionality of membership based organization 16 and directory subscription service 22 can provide specialized services across the network 11, for example to private users inside a large organization or to public users via the Internet 11. In the network system 10, the servers can have dedicated functionality and/or can share functionality as described. Enterprise servers are servers that are used in a business context and can be run on/by any capable computer hardware. In the hardware sense, the word server typically designates computer models intended for running software applications under the heavy demand of a network 11 environment. In this client-server configuration one or more machines, either a computer or a computer appliance, share information with each other with one acting as a host for the other. While nearly any personal computer is capable of acting as a network server, a dedicated server will contain features making it more suitable for production environments. These features may include a faster CPU, increased high-performance RAM, and typically more than one large hard drive. More obvious distinctions include marked redundancy in power supplies, network connections, and even the servers themselves.

Figure 3:
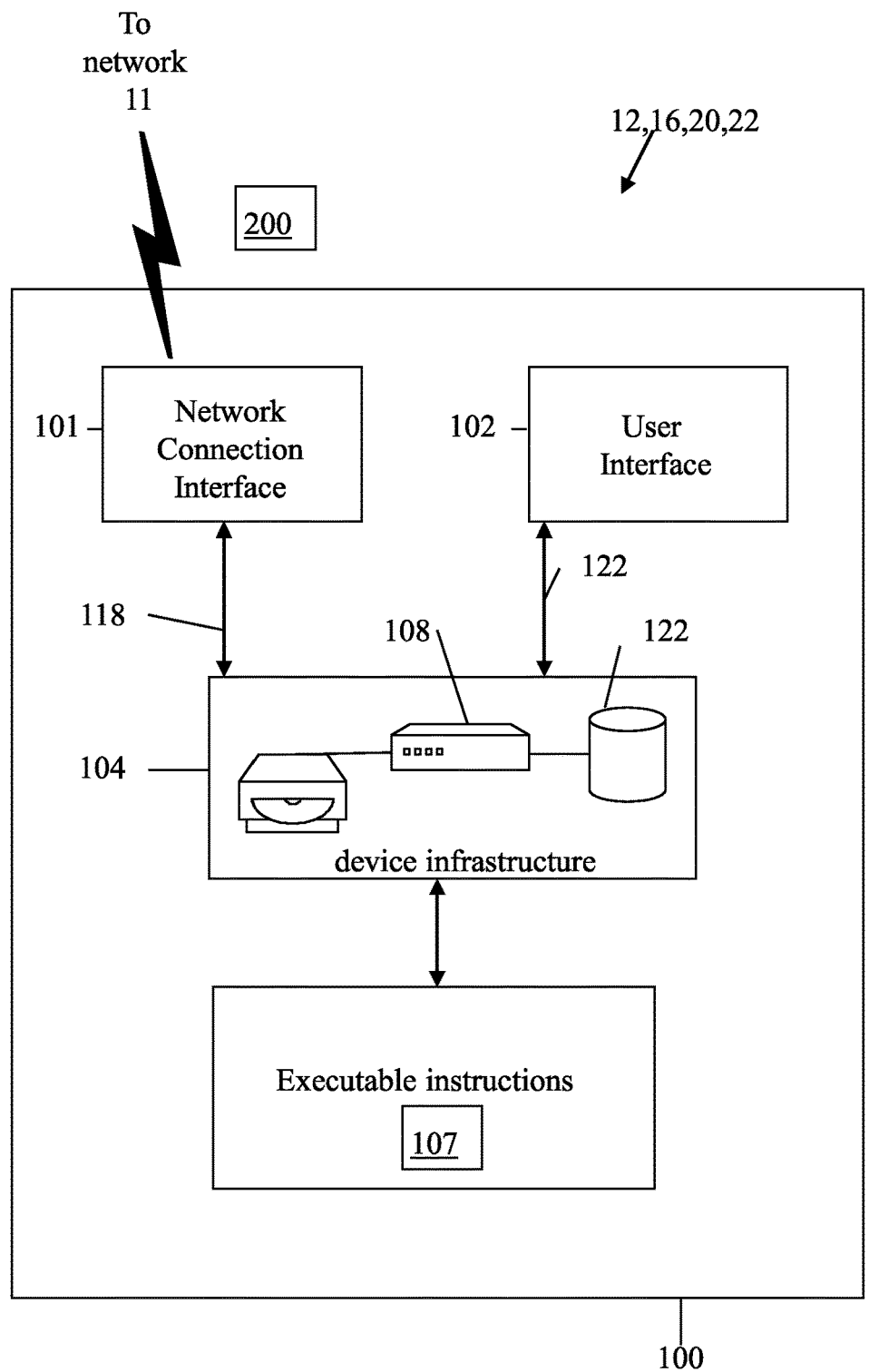
FIG. 3 is an example configuration of a computer device hosting the directory subscription service of FIG. 2.

Referring to FIG. 3, a computing device 100 implementing functionality of member 12, membership based organization 16 and directory subscription service 22 can include a network connection interface 101, such as a network interface card or a modem, coupled via connection 118 to a device infrastructure 104. The connection interface 101 is connectable during operation of the devices to the network 11 (e.g. an intranet and/or an extranet such as the Internet), which enables the devices to communicate with each other as appropriate. The network 11 can support the communication of the communications 32, 44, 52, and the related content 42,43.

Referring again to FIG. 3, the device 100 can also have a user interface 102, coupled to the device infrastructure 104 by connection 122, to interact with a user (e.g. server administrator—not shown). The user interface 102 can include one or more user input devices such as but not limited to a QWERTY keyboard, a keypad, a stylus, a mouse, a microphone and the user output device such as an LCD screen display and/or a speaker. If the screen is touch sensitive, then the display can also be used as the user input device as controlled by the device infrastructure 104.

Referring again to FIG. 3, operation of the device 100 is facilitated by the device infrastructure 104. The device infrastructure 104 includes one or more computer processors 108 and can include an associated memory 122 (e.g. memory 18,23). The computer processor 108 facilitates performance of the device 100 configured for the intended task (e.g. of the respective module(s) of directory subscription service 22) through operation of the network interface 101, the user interface 102 and other application programs/hardware of the device 100 by executing task related instructions. These task related instructions can be provided by an operating system, and/or software applications located in the memory 122, and/or by operability that is configured into the electronic/digital circuitry of the processor(s) 108 designed to perform the specific task(s). Further, it is recognized that the device infrastructure 104 can include a computer readable storage medium coupled to the processor 108 for providing instructions to the processor 108 and/or to load/update the instructions 107 (e.g. modules 30,36,40,50). The computer readable medium can include hardware and/or software such as, by way of example only, magnetic disks, magnetic tape, optically readable medium such as CD/DVD ROMS, and memory cards. In each case, the computer readable medium may take the form of a small disk, floppy diskette, cassette, hard disk drive, solid-state memory card, or RAM provided in the memory module. It should be noted that the above listed example computer readable mediums can be used either alone or in combination.

Further, it is recognized that the computing device 100 can include the executable applications comprising code or machine readable instructions for implementing predetermined functions/operations including those of an operating system and the modules, for example. The processor 108 as used herein is a configured device and/or set of machine-readable instructions for performing operations as described by example above, including those operations as performed by any or all of the modules 30,36,40,50. As used herein, the processor 108 may comprise any one or combination of, hardware, firmware, and/or software. The processor 108 acts upon information by manipulating, analyzing, modifying, converting or transmitting information for use by an executable procedure or an information device, and/or by routing the information with respect to an output device. The processor 108 may use or comprise the capabilities of a controller or microprocessor, for example. Accordingly, any of the functionality of the modules may be implemented in hardware, software or a combination of both. Accordingly, the use of a processor 108 as a device and/or as a set of machine-readable instructions is hereafter referred to generically as a processor/module for sake of simplicity. Further, it is recognised that the directory subscription service 22 can include one or more of the computing devices 100 (comprising hardware and/or software) for implementing the modules, as desired.

It will be understood in view of the above that the computing devices 100 may be, although depicted as a single computer system, may be implemented as a network of computer processors, as desired.

The invention claimed is:

1. A system for generating network presence documents made available on a network, the system comprising:
   a computer processor and memory having instructions stored thereon for implementation by the computer processor to:

receive registration information of a membership name by a member of a membership based organization;

parse the registration information to obtain a set of keywords;

search the network using the set of keywords for publically available information about the member;

create member information based on information obtained from the search using the set of keywords;

generate a trusted network presence document of the network presence documents to include at least a first portion of the registration information as read only content with respect to the member as restricted from customization by the member;

controlling access to the first portion by receiving access credentials associated with the member, validating the received access credentials in order to restrict said access to the first portion by the member such that the member is restricted from modifying the read only content;

receiving customization information from the member and modifying using the customization information a second portion of registration information other than the first portion to produce customized content;

create a link between a profile document and the trusted network presence document of the network presence documents, the link configured for placement on at least one of the network presence documents such that the profile document and the trusted network presence document would be linked to one another, the profile document including the second portion of the registrant information as the customized content with respect to the member such that the member is allowed to customize the second portion in view of said access; and publish the network presence documents on the network.

2. The system of claim 1 further comprising: generate the profile document using a template to select an initial content; and placement of a second portion of the registration information on the profile document and publish the profile document on the network.

3. The system of claim 2, wherein some of the second portion of the registration information contains duplicate content of the first portion of the registration information.

4. The system of claim 2, wherein the link is positioned on the profile document.

5. The system of claim 1, wherein said information is from trusted information sources having respective publically available information about the member which is unbiased towards the member.

6. The system of claim 1, wherein the search is performed only on specified sources of the publically available information, such that the specified sources are third party social media sources considered independent of the member.

7. The system of claim 1, wherein the search is performed only on specified sources of the publically available information, such that the specified sources are third party news feed sources considered independent of the member.

8. The system of claim 1, wherein the search is conducted using a network crawler.

9. The system of claim 8, wherein the search is performed on a predefined periodic basis with the purpose of updating the registration information.

10. The system of claim 9 further comprising: regenerate the trusted network presence document using the updated registration information; and republish the trusted network presence document on the network.

11. The system of claim 8 further comprising: update the registration information based on received notification information associated with the member; and republish the trusted network presence document on the network.

12. The system of claim 1, wherein the registration information includes additional private information from private sources, such that the additional private information is unavailable on the network.

13. The system of claim 1, wherein the registration information is administrative contact information connected with the membership name.

14. The system of claim 13, wherein the registration information includes information about the member of the membership name.

15. The system of claim 1, wherein the registration information is associated with a subscription request of the member with the directory service.

16. The system of claim 15, wherein the registration information is provided by the membership based organization on behalf of the member of the membership name.

17. The system of claim 15, wherein the directory service is hosted by the membership based organization.

18. The system of claim 2 further comprising: receive a customization request from the member including update content; update the customizable content using the update content; and republish the profile document on the network.

19. The system of claim 18, wherein the update content includes structural markers of a markup language used to write the profile document.

20. The system of claim 1 further comprising: receive a feedback message including feedback content from the member; associate the feedback content with the read-only content and republish the trusted network presence document.

21. A system for generating network presence documents made available on a network, the system comprising:

a computer processor and memory having instructions stored thereon for implementation by the computer processor to:

receive registration information of a membership name by a member for a membership based organization;

receive information about the member from a plurality of network users;

combine the information as aggregate registration information representing crowd sourced content of the plurality of network users;

generate a trusted network presence document of the network presence documents to include at least a portion of the aggregate registration information as read only content with respect to the member as restricted from customization by the member;

controlling access to the first portion by receiving access credentials associated with the member, validating the received access credentials in order to restrict said access to the first portion by the member such that the member is restricted from modifying the read only content;

receiving customization information from the member and modifying using the customization information a second portion of registration information other than the first portion to produce customized content;

create a link between a profile document and the trusted network presence document of the network presence documents, the link configured for placement on at least one of the network presence documents such that the profile document and the trusted network presence document would be linked to one another, the profile document to include the second portion of the registrant information as the customized content with respect to the member such that the member is allowed to customize the second portion in view of said access; and
publish the network presence documents on the network.

22. A system for generating network presence documents made available on a network, the system comprising:
  a computer processor and memory having instructions stored thereon for implementation by the computer processor to:
  receive registration information of a membership name by a member for a membership based organization;
  provide access to information about the member to a plurality of network users, the information being aggregate registration information representing crowd sourced content;
  receive individual votes from the plurality of network users on the aggregate registration information for a specified character of the aggregate registration information;
  generate a trusted network presence document of the network presence documents to include at least a portion of the aggregate registration information as read only content with respect to the member as restricted from customization by the member;
  controlling access to the first portion by receiving access credentials associated with the member, validating the received access credentials in order to restrict said access to the first portion by the member such that the member is restricted from modifying the read only content;
  receiving customization information from the member and modifying using the customization information a second portion of registration information other than the first portion to produce customized content;
  create a link between a profile document and the trusted network presence document of the network presence documents, the link configured for placement on at least one of the network presence documents such that the profile document and the trusted network presence document would be linked to one another, the profile document to include the second portion of the registrant information as the customized content with respect to the member such that the member is allowed to customize the second portion in view of said access; and
  publish the network presence documents on the network.

23. The system of claim 1 further comprising generating the link as a navigational mechanism such that the navigational mechanism is also restricted to read only access in view of said access credentials.

24. The system of claim 21 further comprising generating the link as a navigational mechanism such that the navigational mechanism is also restricted to read only access in view of said access credentials.

25. The system of claim 22 further comprising generating the link as a navigational mechanism such that the navigational mechanism is also restricted to read only access in view of said access credentials.

* * * * *